US009022159B2

(12) United States Patent
Urakami

(10) Patent No.: US 9,022,159 B2
(45) Date of Patent: May 5, 2015

(54) CLEANING DEVICE FOR WINDOW GLASS

(75) Inventor: Fukashi Urakami, Yokohama (JP)

(73) Assignees: Urakami LLC, Kanagawa (JP); Fujii Denko Co., Ltd., Hyogo (JP)

( * ) Notice: Subject to any disclaimer, the term of this patent is extended or adjusted under 35 U.S.C. 154(b) by 19 days.

(21) Appl. No.: 13/823,242

(22) PCT Filed: Sep. 12, 2011

(86) PCT No.: PCT/JP2011/070659
§ 371 (c)(1),
(2), (4) Date: Apr. 26, 2013

(87) PCT Pub. No.: WO2012/036101
PCT Pub. Date: Mar. 22, 2012

(65) Prior Publication Data
US 2013/0206492 A1 Aug. 15, 2013

(30) Foreign Application Priority Data
Sep. 15, 2010 (JP) ................................. 2010-207382

(51) Int. Cl.
B60K 26/02 (2006.01)
A47L 1/02 (2006.01)
B62D 57/024 (2006.01)
B62D 63/04 (2006.01)

(52) U.S. Cl.
CPC .................. *A47L 1/02* (2013.01); *B62D 57/024* (2013.01); *B62D 63/04* (2013.01); *Y10S 901/01* (2013.01)

(58) Field of Classification Search
CPC ........ A47L 1/02; B62D 63/04; B62D 57/024; Y10S 901/01
USPC ...................... 180/8.1, 8.3, 8.5, 8.6, 164, 901
See application file for complete search history.

(56) References Cited

U.S. PATENT DOCUMENTS 5,575,346 A * 11/1996 Yberle ............................ 180/8.6
2007/0235239 A1* 10/2007 Urakami ........................ 180/164

FOREIGN PATENT DOCUMENTS

| JP | 03-104785 A | 5/1991 |
| JP | 05-042063 A | 2/1993 |
| JP | 10-024875 A | 1/1998 |

OTHER PUBLICATIONS

Official Communication issued in International Patent Application No. PCT/JP2011/070659, mailed on Feb. 21, 2012.

*Primary Examiner* — Joseph Rocca
*Assistant Examiner* — Jacob Knutson
(74) *Attorney, Agent, or Firm* — Keating & Bennett, LLP

(57) ABSTRACT

[OBJECT] To provide a device which is held by vacuum on a wall surface or a window surface of glass of a building, and which is moved along the surface, thereby performing the cleaning operation.

[SOLVING MEANS] In three clinging units which are arranged in a row, each of the clinging units includes clinging unit putting forward/backward means for putting the clinging unit in and out in a direction intersecting with the surface. The clinging units adjacent to each other are coupled by transverse expansion and contraction means via the clinging unit putting forward/backward means, so as to constitute a row clinging unit group. In three row clinging unit groups which are arranged in the longitudinal direction, the row clinging unit groups adjacent to each other are coupled by lengthwise expansion and contraction means via the clinging unit putting forward/backward means. Each of the clinging units can be selectively set in one of three states, i.e., a clinging and movable state in which the unit clings to the surface and moves along the surface, a clinging and locked state in which the unit clings to the surface and is locked to the surface, and a non-clinging and movable state in which the unit is separated from the surface and can move along the surface. Each of the clinging units is constituted at least by a clinging unit frame member, a vacuum sealing member attached to the clinging unit, moving means, and locking means. At least the surface, the clinging unit frame member, and the vacuum sealing member define a reduced pressure space in cooperation. The reduced pressure space is coupled to vacuum generating means and vacuum breaking means.

5 Claims, 17 Drawing Sheets

(1)

(2)

(3)

(4)

(16)

(17)

(18)

(19)

CLEANING DEVICE FOR WINDOW GLASS

TECHNICAL FIELD

The present invention relates to a device which performs cleaning operation while being held by vacuum on a wall surface, a window surface, or the like of glass of a building, and being moved along the surface.

BACKGROUND ART

Japanese Laid-Open Patent Publication No. 5-42063 proposes a device which clings to a surface and can be moved along the surface including: four sets of vertical expansion and contraction means; one set of width direction expansion and contraction means disposed for each one of the four sets of vertical expansion and contraction means; clinging units of which is disposed for each one of the width direction expansion and contraction means; and first putting forward/backward means interposed between the clinging unit and the width direction expansion and contraction means, the device being characterized in that each of the clinging units is selectively set at least in the following three states: (1) a clinging and movable state in which the device can be moved along the surface and in close contact with the surface; (2) a clinging and locked state in which the device clings to the surface in a locked manner; and (3) a non-clinging and movable state in which the device is separated from the surface and can be moved along the surface.

Japanese Laid-Open Patent Publication No. 5-42063 mentioned above proposes a device which clings to a surface and can be moved along the surface in which, in the case where a protruding bar such as a window glass frame exists on the surface, and when the protruding bar extends in the horizontal direction and the vertical direction and has a number of crossing portions, the device can be moved by stepping over the protruding bar in either of the horizontal direction or the vertical direction. In the above-described device, the cleaning direction is supposed to be only the horizontal direction. The cleaning in the vertical direction is not supposed.

In the above-described device, when the device is moved by stepping over the window glass frame extending in the horizontal direction, two of the four clinging units are separated from the window glass, i.e., only the half of the clinging units included in the device is held by vacuum on the window glass, so that the device has insufficient stability in vacuum holding. Thus, for example, on the surface of a window glass which forms an angle of 90 degrees or less with the ground, i.e., on the surface of a window glass in a so-called overhanging condition, the device involves a problem that it cannot be moved by stepping over the window glass frame extending in the horizontal direction.

PATENT DOCUMENT 1

Japanese Laid-Open Patent Publication No. 5-42063

SUMMARY OF THE INVENTION

Problem to be Solved by the Invention

The present invention has been conducted in view of the above-described prior art, and provides "a cleaning device for a window glass or the like" with superior stability in vacuum holding, which can move on the surface of a window glass or the like and clean the surface in either of the transverse direction or the longitudinal direction, and in which six of nine clinging units included in the device of the present invention are always held by vacuum on the window glass in the case where the device moves by stepping over the window glass frame, i.e., two thirds of the clinging units included in the device are held by vacuum on the window glass.

In order to solve the above-described technical problems, the objective of the present invention is to provide "a cleaning device for a window glass or the like", as recited in claim 1, wherein, in three clinging units which are arranged in a row,
each of the clinging units includes height direction expansion and contraction means for putting the clinging unit in and out in a direction intersecting with a surface,
the clinging units adjacent to each other are coupled by transverse expansion and contraction means via the height direction expansion and contraction means,
when the three clinging units coupled by the transverse expansion and contraction means via the height direction expansion and contraction means are referred to a row clinging unit group,
three row clinging unit groups are arranged in the longitudinal direction,
the row clinging unit groups adjacent to each other are coupled by lengthwise expansion and contraction means via the height direction expansion and contraction means,
each of the clinging units can be selectively set in either one of the following three states:
a clinging and movable state in which the clinging unit clings to the surface and moves along the surface;
a clinging and locked state in which the clinging unit clings to the surface and is locked to the surface; and
a non-clinging and movable state in which the clinging unit is separated from the surface and can move along the surface,
each of the clinging units is constituted at least by a clinging unit frame member, a vacuum sealing member attached to the clinging unit, moving means, and locking means, and
at least the surface, the clinging unit frame member, and the vacuum sealing member define a reduced pressure space in cooperation, the reduced pressure space being coupled to vacuum generating means and vacuum breaking means.

In order to solve the above-described technical problems, the objective of the present invention is to further provide "the cleaning device for a window glass or the like" according to claim 1, wherein
each of the clinging units includes:
a transverse running wheel unit which enables a transverse running wheel having a shaft extending in a direction parallel to the surface and in the longitudinal direction to protrude toward the surface and to move in the transverse direction, and enables the wheel to be retracted from the surface, thereby locking the clinging unit; and
a lengthwise running wheel unit which enables a lengthwise running wheel having a shaft extending in a direction parallel to the surface and in the transverse direction to protrude toward the surface and to move in the longitudinal direction, and enables the wheel to be retracted from the surface, thereby locking the clinging unit, and
the transverse running wheel unit and the lengthwise running wheel unit constitute the moving means and the locking means, as recited in claim 2.

Effects of the Invention

The cleaning device for a window glass or the like of the present invention can attain such effects that the device can move on the surface of a window glass or the like and clean the surface in either of the transverse direction or the longitudinal direction, and that, when the device moves by stepping over the window glass frame, six of nine clinging units included in the device of the present invention are always held by vacuum on the window glass, i.e., two thirds of the clinging units included in the device are held by vacuum, so that the device has superior stability in vacuum holding.

BEST EMBODIMENTS FOR EMBODYING THE INVENTION

Hereinafter a preferred embodiment of the device configured in accordance with the present invention will be described in detail with reference to the accompanying drawings.

Embodiments

With reference to FIG. 1 to FIG. 8, the device in the embodiment of the present invention will be described.

FIG. 1 shows an embodiment in which the device of the present invention held by vacuum on the glass window surface is viewed from the front thereof. In FIG. 1, the up/down directions correspond to the actual up/down directions. Similarly, the right/left directions correspond to the actual right/left directions.

In this specification, in the direction orthogonal to the glass window surface, a direction getting closer to the glass window surface is referred to as a forward direction, and a direction getting away from the glass window surface is referred to as a backward direction.

As for the device shown in the figure, in three clinging units 4 which are arranged in a row, each of the clinging units 4 includes clinging unit putting forward/backward means 80, constituted by pneumatic cylinders, for putting in and out the clinging unit 4 in a direction intersecting with a glass window surface 32, the clinging units adjacent to each other are coupled by transverse expansion and contraction means 62 constituted by a pneumatic cylinder via the clinging unit putting forward/backward means 80, when the three clinging units 4 coupled by the transverse expansion and contraction means 62 via the clinging unit putting forward/backward means 80 are referred to as a row clinging unit group, three row clinging unit groups are arranged lengthwise, and the row clinging unit groups adjacent to each other are coupled by lengthwise expansion and contraction means 68 by a pneumatic cylinder via the clinging unit putting forward/backward means 80.

Each of the nine clinging units 4 will be described below in detail.

To an end of a piston rod of each of two pneumatic cylinders constituting the putting forward/backward means 80, respective one clinging unit frame member 16 is fixed.

The clinging unit frame member 16 has a box-like shape which opens in a direction opposed to the glass window surface 32. To a flange portion existing in the opening portion, a rectangular and annular vacuum sealing member 26 formed of a flexible member such as polyurethane is fixed.

A free end portion of the vacuum sealing member 26 moves in the condition where it is in contact with the glass window surface 32, thereby cleaning the glass window surface 32.

The glass window surface 32, the clinging unit frame member 16, and the vacuum sealing member 26 define a reduced pressure space 34 in cooperation. The reduced pressure space 34 is coupled to vacuum generating unit VG (shown schematically) and vacuum breaking unit VB (shown schematically).

Each of the clinging units 4 includes a transverse running wheel unit 48 which enables a transverse running wheel 481 having a shaft extending in a direction parallel to the glass window surface 32 and in the longitudinal direction to protrude toward the glass window surface 32 and to move in the transverse direction, and enables the wheel to be retracted from the glass window surface 32 and to be locked by transverse running wheel unit putting forward/backward means 46 constituted by a pneumatic cylinder, and a lengthwise running wheel unit 88 which enables a lengthwise running wheel 881 having a shaft extending in a direction parallel to the glass window surface 32 and in the transverse direction to protrude toward the glass window surface 32 and to move in the longitudinal direction, and enables the wheel to be retracted from the glass window surface 32 and to be locked by lengthwise running wheel unit putting forward/backward means 86 constituted by a pneumatic cylinder.

The transverse running wheel unit 48 and the lengthwise running wheel unit 88 constitute moving means and locking means.

Respective cylinder cases of the transverse running wheel unit putting forward/backward means 46 and the lengthwise running wheel unit putting forward/backward means 86 are fixed to the clinging unit frame member 16.

To an end of a piston rod of the transverse running wheel unit putting forward/backward means 46, as shown in FIG. 7, FIG. 8, and FIG. 10, three transverse running wheels 481 are rotatably attached with bolts by means of an inverted T shape metal attachment which is fixed to the end of the piston rod with a bolt.

To an end of a piston rod of the lengthwise running wheel unit putting forward/backward means 86, as shown in FIG. 7, FIG. 8, and FIG. 10, four lengthwise running wheels 881 are rotatably attached with bolts by means of an inverted U shape metal attachment which is fixed to the end of the piston rod with a bolt.

On the inside of the clinging unit frame member 16, a locking member 38 of synthetic rubber is fixed. When the piston rod of the transverse running wheel unit putting forward/backward means 46 is retracted, the transverse running wheels 481 are pressed against the locking member 38, so as to lock the transverse running wheels 481.

When the piston rod of the lengthwise running wheel unit putting forward/backward means 86 is retracted, the lengthwise running wheels 881 are pressed against the locking member 38, so as to lock the lengthwise running wheels 881.

As for the pneumatic cylinders constituting the clinging unit putting forward/backward means 80, the transverse expansion and contraction means 62, the lengthwise expansion and contraction means 68, the transverse running wheel unit putting forward/backward means 46, and the lengthwise running wheel unit 88, each of the pneumatic cylinders is a pneumatic cylinder which is rectangular in section, so that the piston rod of the respective pneumatic cylinder will not rotate.

In the row clinging unit group, an end of each of piston rods of the pneumatic cylinders constituting the two sets of transverse expansion and contraction means 68 is fixed to the side face of a respective cylinder case of the two pneumatic cylinders constituting the clinging unit putting forward/backward means 80 existing in the center portion of the row clinging unit group via a C-shaped frame 81, and a side face of each of the cylinder cases of the pneumatic cylinders constituting the two sets of transverse expansion and contraction means 68 is fixed to a side face of each of cylinder cases of the two pneumatic cylinders constituting the two sets of clinging unit putting forward/backward means 80 existing in the side portions of the row clinging unit group via the C-shaped frame 81.

An end of each of piston rods of the pneumatic cylinders constituting the two sets of longitudinal expansion and contraction means 68 is fixed to the side face of a cylinder case of respective two pneumatic cylinders constituting the clinging unit putting forward/backward means 80 existing in the center portion of the center one of the row clinging unit groups via a box-shaped frame 82, and a side face of each of the cylinder case of the pneumatic cylinders constituting the two sets of longitudinal expansion and contraction means 68 is fixed to a side face of each of the cylinder cases of the two pneumatic cylinders constituting the clinging unit putting forward/backward means 80 existing in the center portion of the two row clinging unit groups existing in the end portions via the C-shaped frame 81.

The function of the device in this embodiment of the present invention will be described below.

In the case where a glass window surface 32 of a building is cleaned, for example, the reduced pressure spaces 34 of the nine clinging units 4 are connected to the vacuum generating means (not shown), so as to hold the clinging units 4 on the surface 32 by vacuum.

FIG. 1 to FIG. 16 show the conditions where the device in the embodiment of the present invention is held by vacuum on the glass window surface 32. Among the figures, FIG. 1 to FIG. 10 show the conditions where the piston rods of all of the pneumatic cylinders of the six sets of transverse expansion and contraction means 68 and the pneumatic cylinders of the two sets of lengthwise expansion and contraction means 68 are contracted.

FIG. 2, FIG. 4, and FIG. 11 show the condition where the piston rods of all of the pneumatic cylinders of the nine pairs of eighteen clinging unit putting forward/backward means 80 are expanded.

FIG. 3 and FIG. 5 to FIG. 8 show the condition where the piston rods of all of the pneumatic cylinders of the nine pairs of eighteen clinging unit putting forward/backward means 80 are contracted.

FIG. 6, FIG. 7, and FIG. 8 show the condition where the transverse running wheels 481 and the lengthwise running wheels 881 in the uppermost row clinging unit group and the center row clinging unit group among the three row clinging unit groups are both in the locked state, and in the lowermost row clinging unit group, the transverse running wheels 481 are in the locked state, and the lengthwise running wheels 881 are in the rotating state.

In FIG. 6, among the two sets of lengthwise expansion and contraction means 68, when the lower lengthwise expansion and contraction means 68 is expanded, the friction force between the glass window surface 32 and the uppermost row clinging unit group and the center row clinging unit group is large, and the friction force between the glass window surface 32 and the lowermost row clinging unit group is small. As a result, the lowermost row clinging unit group is moved downwards while being held by vacuum on the glass window surface 32, thereby simultaneously performing the cleaning operation for the glass window surface 32.

FIG. 11 shows the procedure in which the device in the embodiment of the present invention is held by vacuum on the glass window surface 32, and moved along the glass window surface 32 from the left to the right, thereby performing the cleaning for the glass window surface 32.

In FIG. 11, (1) to (4) are four sets of top views and plan views showing four situations of the device in the embodiment of the present invention. The four sets of top views and plan views are arranged from the left to the right in the order of time series.

In FIG. 11, (1) to (4) show the condition where all of the nine clinging units 4 of the device in the embodiment of the present invention are held by vacuum on the glass window surface 32, and all of the pneumatic cylinders of the nine pairs of eighteen clinging unit putting forward/backward means 80 are expanded.

In FIG. 11, (1) shows the condition where the piston rods of all of the pneumatic cylinders of the six sets of transverse expansion and contraction means 68 and the pneumatic cylinders of the two sets of lengthwise expansion and contraction means 68 are contracted, and all of the transverse running wheels 481 and the lengthwise running wheels 881 are both in the locked state in the nine clinging units 4.

In FIG. 11, (2) shows the condition where in the three clinging units 4 existing in the longitudinal direction in the left end and the three clinging units 4 existing in the longitudinal direction in the center, the transverse running wheels 481 and the lengthwise running wheels 881 are both in the locked state; and in the three clinging units 4 existing in the longitudinal direction in the right end, the transverse running wheels 481 are in the rotating state and the lengthwise running wheels 881 are in the locked state.

In the above-described condition, the pneumatic cylinders of the three sets of transverse expansion and contraction means 68 on the right side are expanded, so that the three clinging units 4 existing in the longitudinal direction in the right end are moved from the left to the right.

In FIG. 11, (3) shows the condition where in the three clinging units 4 existing in the longitudinal direction in the left end and the three clinging units 4 existing in the longitudinal direction in the right end, the transverse running wheels 481 and the lengthwise running wheels 881 are both in the locked state; and in the three clinging units 4 disposed in the longitudinal direction in the center, the transverse running wheels 481 are in the rotating state and the lengthwise running wheels 881 are in the locked state.

In the above-described condition, the pneumatic cylinders of the three sets of transverse expansion and contraction means 68 on the left side are expanded, and the pneumatic cylinders of the three sets of transverse expansion and contraction means 68 on the right side are contracted, so that the three clinging units 4 existing in the longitudinal direction in the center are moved from the left to the right.

In FIG. 11, (4) shows the condition where in the three clinging units 4 existing in the longitudinal direction in the right end and the three clinging units 4 existing in the longitudinal direction in the center, the transverse running wheels 481 and the lengthwise running wheels 881 are both in the locked state; and in the three clinging units 4 existing in the longitudinal direction in the left end, the transverse running wheels 481 are in the rotating state and the lengthwise running wheels 881 are in the locked state.

In the above-described condition, the pneumatic cylinders of the three sets of transverse expansion and contraction means 68 on the left side are contracted, so that the three clinging units 4 existing in the longitudinal direction in the left end are moved from the left to the right.

As described above, the device in the embodiment of the present invention repeats the situations in the order of (2), (3), (4), and (2) in FIG. 11, so as to perform the cleaning for the glass window surface 32 while being moved from the left to the right.

FIG. 12 shows the procedure in which the device in the embodiment of the present invention is held by vacuum on the glass window surface 32, and moved along the glass window surface 32 from the top to the bottom, thereby performing the cleaning for the glass window surface 32.

In FIG. 12, (1) to (4) are four sets of right side views and plan views showing four situations of the device in the embodiment of the present invention. The four sets of right side views and plan views are arranged from the top to the bottom in the order of time series.

In FIG. 12, (1) to (4) show the condition where all of the nine clinging units 4 of the device in the embodiment of the present invention are held by vacuum on the glass window surface 32, and all of the pneumatic cylinders of the nine pairs of eighteen clinging unit putting forward/backward means 80 are expanded.

In FIG. 12, (1) shows the condition where the piston rods of all of the pneumatic cylinders of the six sets of transverse expansion and contraction means 68 and the pneumatic cylinders of the two sets of lengthwise expansion and contraction means 68 are contracted, and all of the transverse running wheels 481 and the lengthwise running wheels 881 are both in the locked state in the nine clinging units 4.

In FIG. 12, (2) shows the condition where in the three clinging units 4 existing in the transverse direction in the upper end and the three clinging units 4 existing in the transverse direction in the center, the transverse running wheels 481 and the lengthwise running wheels 881 are both in the locked state; and in the three clinging units 4 existing in the transverse direction in the lower end, the transverse running wheels 481 are in the locked state and the lengthwise running wheels 881 are in the rotating state.

In the above-described condition, the pneumatic cylinders of the lengthwise expansion and contraction means 68 on the lower side are expanded, so that the three clinging units 4 existing in the transverse direction in the lower end are moved from the top to the bottom.

In FIG. 12, (3) shows the condition where in the three clinging units 4 existing in the transverse direction in the upper end and the three clinging units 4 existing in the transverse direction in the lower end, the transverse running wheels 481 and the lengthwise running wheels 881 are both in the locked state; and in the three clinging units 4 existing in the transverse direction in the center, the transverse running wheels 481 are in the locked state and the lengthwise running wheels 881 are in the rotating state.

In the above-described condition, the pneumatic cylinders of the lengthwise expansion and contraction means 68 on the upper side are expanded, and the pneumatic cylinders of the lengthwise expansion and contraction means 68 on the lower side are contracted, so that the three clinging units 4 existing in the transverse direction in the center are moved from the top to the bottom.

In FIG. 12, (4) shows the condition where in the three clinging units 4 existing in the transverse direction in the lower end and the three clinging units 4 existing in the transverse direction in the center, the transverse running wheels 481 and the lengthwise running wheels 881 are both in the locked state; and in the three clinging units 4 existing in the transverse direction in the upper end, the transverse running wheels 481 are in the locked state and the lengthwise running wheels 881 are in the rotating state.

In the above-described condition, the pneumatic cylinders of the three sets of lengthwise expansion and contraction means 68 on the upper side are contracted, so that the three clinging units 4 existing in the transverse direction in the upper end are moved from the top to the bottom.

As described above, the device in the embodiment of the present invention repeats the situations in the order of (2), (3), (4), and (2) in FIG. 12, so as to perform the cleaning for the glass window surface 32 while being moved from the top to the bottom.

FIG. 13 to FIG. 16 show the procedure in which the device in the embodiment of the present invention is held by vacuum on the glass window surface 32, moved along the glass window surface 32 from the top to the bottom, and moved by stepping over the window frame 321, thereby performing the cleaning for the glass window surface 32.

In FIG. 13 to FIG. 16, (1) to (19) are nineteen sets of right side views and plan views showing nineteen situations of the device in the embodiment of the present invention. The nineteen sets of right side views and plan views are arranged from the top to the bottom in the order of time series.

In FIG. 13, (1) to (2) show the condition where all of the nine clinging units 4 of the device in the embodiment of the present invention are held by vacuum on the glass window surface 32, and all of the pneumatic cylinders of the nine pairs of eighteen clinging unit putting forward/backward means 80 are expanded.

In FIG. 13, (1) shows the condition where the piston rods of all of the pneumatic cylinders of the six sets of transverse expansion and contraction means 68 and the pneumatic cylinders of the two sets of lengthwise expansion and contraction means 68 are contracted, and all of the transverse running wheels 481 and the lengthwise running wheels 881 are both in the locked state in the nine clinging units 4.

In FIG. 13, (2) shows the condition where in the three clinging units 4 existing in the transverse direction in the upper end and the three clinging units 4 existing in the transverse direction in the center, the transverse running wheels 481 and the lengthwise running wheels 881 are both in the locked state; and in the three clinging units 4 existing in the transverse direction in the lower end, the transverse running wheels 481 are in the locked state and the lengthwise running wheels 881 are in the rotating state.

In the above-described condition, the pneumatic cylinders of the lengthwise expansion and contraction means 68 on the lower side are expanded, so that the three clinging units 4 existing in the transverse direction in the lower end are moved from the top to the bottom.

In FIG. 13, (3) shows the condition where the three clinging units 4 existing in the transverse direction in the upper end and the three clinging units 4 existing in the transverse direction in the center are held by vacuum on the glass window surface 32;

in the three clinging units 4 existing in the transverse direction in the upper end and the three clinging units 4 existing in the transverse direction in the center, the transverse running wheels 481 and the lengthwise running wheels 881 are both in the locked state;

in the three clinging units 4 existing in the transverse direction in the upper end and the three clinging units 4 existing in the transverse direction in the center, the pneumatic cylinders of the clinging unit putting forward/backward means 80 are expanded;

in the three clinging units 4 existing in the transverse direction in the lower end, the transverse running wheels 481 and the lengthwise running wheels 881 are both in the locked state;

the three clinging units 4 existing in the transverse direction in the lower end is released from the coupling to the vacuum generating means (not shown) and separated from the glass window surface 32;

in the three clinging units 4 existing in the transverse direction in the lower end, the pneumatic cylinders of the clinging unit putting forward/backward means 80 are contracted; and the pneumatic cylinders of the lengthwise expansion and contraction means 68 on the lower side are expanded.

In FIG. 13, (4) shows the condition where the three clinging units 4 existing in the transverse direction in the upper end and the three clinging units 4 existing in the transverse direction in the center are held by vacuum on the glass window surface 32;

in the three clinging units 4 existing in the transverse direction in the upper end, the transverse running wheels 481 and the lengthwise running wheels 881 are both in the locked state;

in the three clinging units 4 existing in the transverse direction in the center, the transverse running wheels 481 are in the locked state and the lengthwise running wheels 881 are in the rotating state;

in the three clinging units 4 existing in the transverse direction in the upper end and the three clinging units 4 existing in the transverse direction in the center, the pneumatic cylinders of the clinging unit putting forward/backward means 80 are expanded;

in the three clinging units 4 existing in the transverse direction in the lower end, the transverse running wheels 481 and the lengthwise running wheels 881 are both in the locked state;

the three clinging units 4 existing in the transverse direction in the lower end are released from the coupling to the vacuum generating means (not shown) and separated from the glass window surface 32;

in the three clinging units 4 existing in the transverse direction in the lower end, the pneumatic cylinders of the clinging unit putting forward/backward means 80 are contracted; and the pneumatic cylinders of the lengthwise expansion and contraction means 68 on the lower side are expanded.

In the above-described condition, the pneumatic cylinders of the lengthwise expansion and contraction means 68 on the upper side are expanded, so that the three clinging units 4 existing in the transverse direction in the center are moved from the top to the bottom.

In FIG. 13, (5) shows the condition where the three clinging units 4 existing in the transverse direction in the upper end and the three clinging units 4 existing in the transverse direction in the center are held by vacuum on the glass window surface 32;

in the three clinging units 4 existing in the transverse direction in the upper end, the transverse running wheels 481 are in the locked state and the lengthwise running wheels 881 are in the rotating state;

in the three clinging units 4 existing in the transverse direction in the center, the transverse running wheels 481 and the lengthwise running wheels 881 are both in the locked state;

in the three clinging units 4 existing in the transverse direction in the upper end and the three clinging units 4 existing in the transverse direction in the center, the pneumatic cylinders of the clinging unit putting forward/backward means 80 are expanded;

in the three clinging units 4 existing in the transverse direction in the lower end, the transverse running wheels 481 and the lengthwise running wheels 881 are both in the locked state;

the three clinging units 4 existing in the transverse direction in the lower end is released from the coupling to the vacuum generating means (not shown) and separated from the glass window surface 32;

in the three clinging units 4 existing in the transverse direction in the lower end, the pneumatic cylinders of the clinging unit putting forward/backward means 80 are contracted; and the pneumatic cylinders of the lengthwise expansion and contraction means 68 on the lower side are expanded.

In the above-described condition, the pneumatic cylinders of the lengthwise expansion and contraction means 68 on the upper side are contracted, so that the three clinging units 4 existing in the transverse direction in the upper end are moved from the top to the bottom.

In FIG. 14, (6) shows the condition where the three clinging units 4 existing in the transverse direction in the upper end and the three clinging units 4 existing in the transverse direction in the center are held by vacuum on the glass window surface 32;

in the three clinging units 4 existing in the transverse direction in the upper end, the transverse running wheels 481 and the lengthwise running wheels 881 are both in the locked state;

in the three clinging units 4 existing in the transverse direction in the center, the transverse running wheels 481 are in the locked state and the lengthwise running wheels 881 are in the rotating state;

in the three clinging units 4 existing in the transverse direction in the upper end and the three clinging units 4 existing in the transverse direction in the center, the pneumatic cylinders of the clinging unit putting forward/backward means 80 are expanded;

in the three clinging units 4 existing in the transverse direction in the lower end, the transverse running wheels 481 and the lengthwise running wheels 881 are both in the locked state;

the three clinging units 4 existing in the transverse direction in the lower end are released from the coupling to the vacuum generating means (not shown) and separated from the glass window surface 32;

in the three clinging units 4 existing in the transverse direction in the lower end, the pneumatic cylinders of the clinging unit putting forward/backward means 80 are contracted; and the pneumatic cylinders of the lengthwise expansion and contraction means 68 on the lower side are expanded.

In the above-described condition, the pneumatic cylinders of the lengthwise expansion and contraction means 68 on the upper side are expanded, so that the three clinging units 4 existing in the transverse direction in the center are moved from the top to the bottom.

In FIG. 14, (7) shows the condition where the three clinging units 4 existing in the transverse direction in the upper end and the three clinging units 4 existing in the transverse direction in the center are held by vacuum on the glass window surface 32;

in the three clinging units 4 existing in the transverse direction in the upper end, the transverse running wheels 481 are in the locked state and the lengthwise running wheels 881 are in the rotating state;

in the three clinging units 4 existing in the transverse direction in the center, the transverse running wheels 481 and the lengthwise running wheels 881 are both in the locked state;

in the three clinging units 4 existing in the transverse direction in the upper end and the three clinging units 4 existing in the transverse direction in the center, the pneumatic cylinders of the clinging unit putting forward/backward means 80 are expanded;

in the three clinging units 4 existing in the transverse direction in the lower end, the transverse running wheels 481 and the lengthwise running wheels 881 are both in the locked state;

the three clinging units 4 existing in the transverse direction in the lower end are released from the coupling to the vacuum generating means (not shown) and separated from the glass window surface 32;

in the three clinging units 4 existing in the transverse direction in the lower end, the pneumatic cylinders of the clinging unit putting forward/backward means 80 are contracted; and the pneumatic cylinders of the lengthwise expansion and contraction means 68 on the lower side are expanded.

In the above-described condition, the pneumatic cylinders of the lengthwise expansion and contraction means 68 on the upper side are expanded, so that the three clinging units 4 existing in the transverse direction in the upper end are moved from the top to the bottom.

In FIG. 14, (8) shows the condition where the three clinging units 4 existing in the transverse direction in the upper end and the three clinging units 4 existing in the transverse direction in the center are held by vacuum on the glass window surface 32;

in the three clinging units 4 existing in the transverse direction in the upper end, the transverse running wheels 481 and the lengthwise running wheels 881 are both in the locked state;

in the three clinging units 4 existing in the transverse direction in the center, the transverse running wheels 481 are in the locked state and the lengthwise running wheels 881 are in the rotating state;

in the three clinging units 4 existing in the transverse direction in the upper end and the three clinging units 4 existing in the transverse direction in the center, the pneumatic cylinders of the clinging unit putting forward/backward means 80 are expanded;

in the three clinging units 4 existing in the transverse direction in the lower end, the transverse running wheels 481 and the lengthwise running wheels 881 are both in the locked state;

the three clinging units 4 existing in the transverse direction in the lower end are released from the coupling to the vacuum generating means (not shown) and separated from the glass window surface 32;

in the three clinging units 4 existing in the transverse direction in the lower end, the pneumatic cylinders of the clinging unit putting forward/backward means 80 are contracted; and the pneumatic cylinders of the lengthwise expansion and contraction means 68 on the lower side are expanded.

In the above-described condition, the pneumatic cylinders of the lengthwise expansion and contraction means 68 on the upper side are expanded, so that the three clinging units 4 existing in the transverse direction in the center are moved from the top to the bottom, and the movement is stopped in a place adjacent to the window frame 321.

In FIG. 14, (9) shows the condition where the three clinging units 4 existing in the transverse direction in the upper end and the three clinging units 4 existing in the transverse direction in the center are held by vacuum on the glass window surface 32;

in the three clinging units 4 existing in the transverse direction in the upper end, the transverse running wheels 481 are in the locked state and the lengthwise running wheels 881 are in the rotating state;

in the three clinging units 4 existing in the transverse direction in the center, the transverse running wheels 481 and the lengthwise running wheels 881 are both in the locked state;

in the three clinging units 4 existing in the transverse direction in the upper end and the three clinging units 4 existing in the transverse direction in the center, the pneumatic cylinders of the clinging unit putting forward/backward means 80 are expanded;

in the three clinging units 4 existing in the transverse direction in the lower end, the transverse running wheels 481 and the lengthwise running wheels 881 are both in the locked state;

the three clinging units 4 existing in the transverse direction in the lower end are released from the coupling to the vacuum generating means (not shown) and separated from the glass window surface 32;

in the three clinging units 4 existing in the transverse direction in the lower end, the pneumatic cylinders of the clinging unit putting forward/backward means 80 are contracted; and the pneumatic cylinders of the lengthwise expansion and contraction means 68 on the lower side are expanded.

In the above-described condition, the pneumatic cylinders of the lengthwise expansion and contraction means 68 on the upper side are expanded, so that the three clinging units 4 existing in the transverse direction in the upper end are moved from the top to the bottom.

In FIG. 14, (10) shows the condition where the three clinging units 4 existing in the transverse direction in the upper end and the three clinging units 4 existing in the transverse direction in the center are held by vacuum on the glass window surface 32;

in the three clinging units 4 existing in the transverse direction in the upper end, the transverse running wheels 481 and the lengthwise running wheels 881 are both in the locked state;

in the three clinging units 4 existing in the transverse direction in the center, the transverse running wheels 481 and the lengthwise running wheels 881 are both in the locked state;

in the three clinging units 4 existing in the transverse direction in the upper end and the three clinging units 4 existing in the transverse direction in the center, the pneumatic cylinders of the clinging unit putting forward/backward means 80 are expanded;

in the three clinging units 4 existing in the transverse direction in the lower end, the transverse running wheels 481 and the lengthwise running wheels 881 are both in the locked state;

the pneumatic cylinders of the lengthwise expansion and contraction means 68 on the lower side are expanded;

in the above-described condition, in the three clinging units 4 existing in the transverse direction in the lower end, the pneumatic cylinders of the clinging unit putting forward/backward means 80 are expanded; and the connection to the vacuum generating means (not shown) is returned, so that the three clinging units 4 existing in the transverse direction in the lower end are held by vacuum on the glass window surface 32.

In this way, the three clinging units 4 existing in the transverse direction in the lower end are held by vacuum again on the glass window surface 32 after being moved by stepping over the window frame 321, so that they can continue the movement along the glass window substrate 32.

The method in which the three clinging units 4 existing in the transverse direction in the center and the three clinging units 4 existing in the transverse direction in the upper end are moved by stepping over the window frame 321 subsequently to the three clinging units 4 existing in the transverse direction in the lower end is apparent from the above-described procedure and (11) to (19) in FIG. 15 and FIG. 16, so that the description thereof is omitted.

When the clinging unit 4 is moved on the glass window surface 32, a free end of the vacuum sealing member 26 is pressed against the glass window surface 32, so that the cleaning operation is performed for the glass window surface 32 by the vacuum sealing member 26.

It is desired that water spraying means (not shown) is attached to the clinging unit 4, and the cleaning is performed by the vacuum sealing member 26 while the water is sprayed by the water spraying means.

The device in the embodiment of the present invention is a device for performing the cleaning for the surface of a window glass while it is held by vacuum on the surface of the window glass and moved along the surface of the window glass, and it is desirable that the device can be moved always in parallel to a perpendicular window frame 321 or always in parallel to a horizontal window frame 321.

Accordingly, as depicted in FIG. 7 by imaginary lines, a window frame contact bumper 169 is attached to the clinging unit frame member 16, and when the cleaning device is held by vacuum on the glass window surface 32 and moved vertically in a direction toward the horizontal window frame 321 along the glass window surface 32, the window frame contact bumper 169 is caused to collide with the window frame 321, and before the collision, the transverse running wheel 481 of the clinging unit 4 existing on the side which does not collide with the window frame 321 is previously protruded toward the glass window surface 32, so as to be movable in the transverse direction; or a window frame contact bumper 161 is attached to the clinging unit frame member 16, and when the cleaning device is held by vacuum on the glass window surface 32 and moved horizontally in a direction toward the vertical window frame 321 along the glass window surface 32, the window frame contact bumper 161 is caused to collide with the window frame 321, and before the collision, the lengthwise running wheel 881 of the clinging unit 4 existing on the side which does not collide with the window frame 321 is previously protruded toward the glass window surface 32, so as to be movable in the longitudinal direction.

With the above-described configuration, the posture of the cleaning device is corrected to be parallel to the window frame 321.

In (1) of FIG. 17, in the cleaning device which is moving downwards and obliquely from the vertical direction, when the window frame contact bumper 161 collides with the horizontal window frame 321, the cleaning device rotates slightly to the clockwise direction. Thus, as depicted in (2) of FIG. 17, the posture of the cleaning device is corrected to be parallel to the window frame 321.

While preferred embodiments of the device configured in accordance with the present invention have been described in detail with reference to the accompanying drawings, the present invention is not limited to the preferred embodiments. It is to be understood that variations and modifications will be apparent to those skilled in the art without departing from the scope and spirit of the present invention.

INDUSTRIAL APPLICABILITY

The device of the present invention for safely and efficiently performing the cleaning operation for the glass window surface or the like of a building via remote control can be effectively applied to various buildings, and particularly to a building of which all of the wall surfaces are glass windows.

Figure 1:
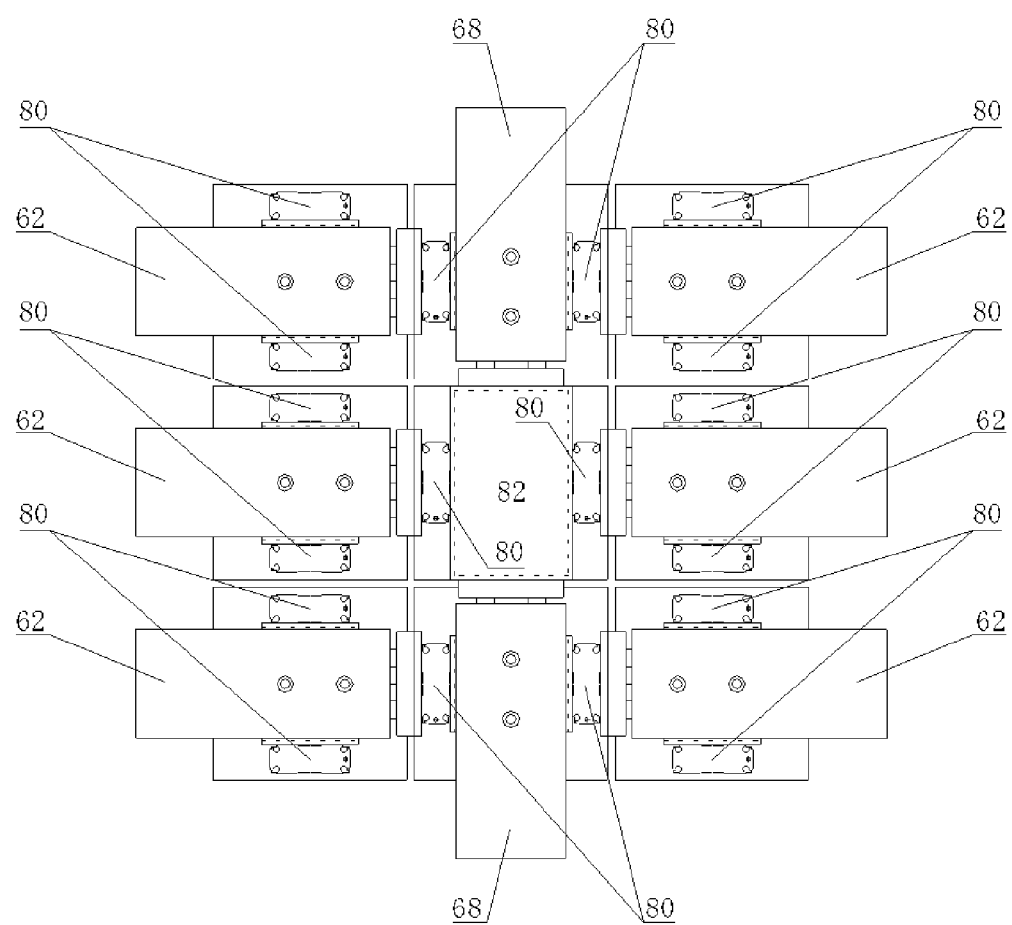
FIG. 1 is a front view showing a preferred embodiment of a device configured in accordance with the present invention.
Figure 2:
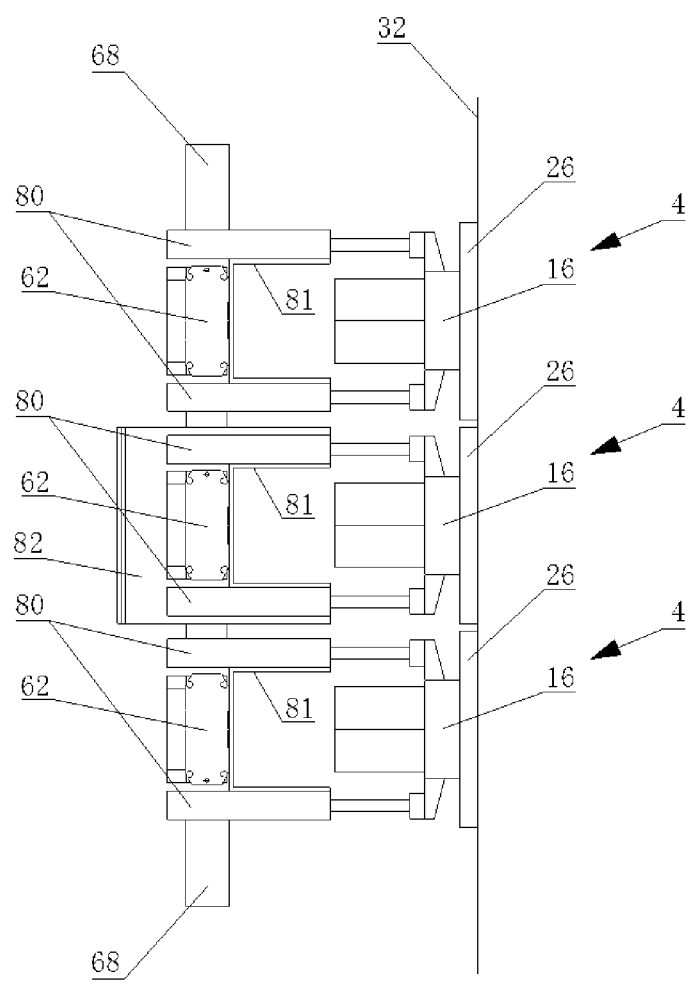
FIG. 2 is a right side view of the device shown in FIG. 1, which shows the condition where clinging unit putting forward/backward means 80 is expanded.
Figure 3:
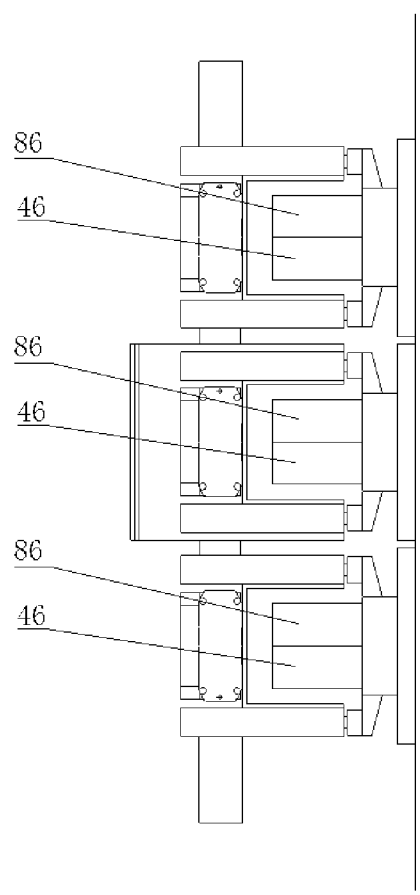
FIG. 3 is a right side view of the device shown in FIG. 1, which shows the condition where the clinging unit putting forward/backward means 80 is contracted.
Figure 4:
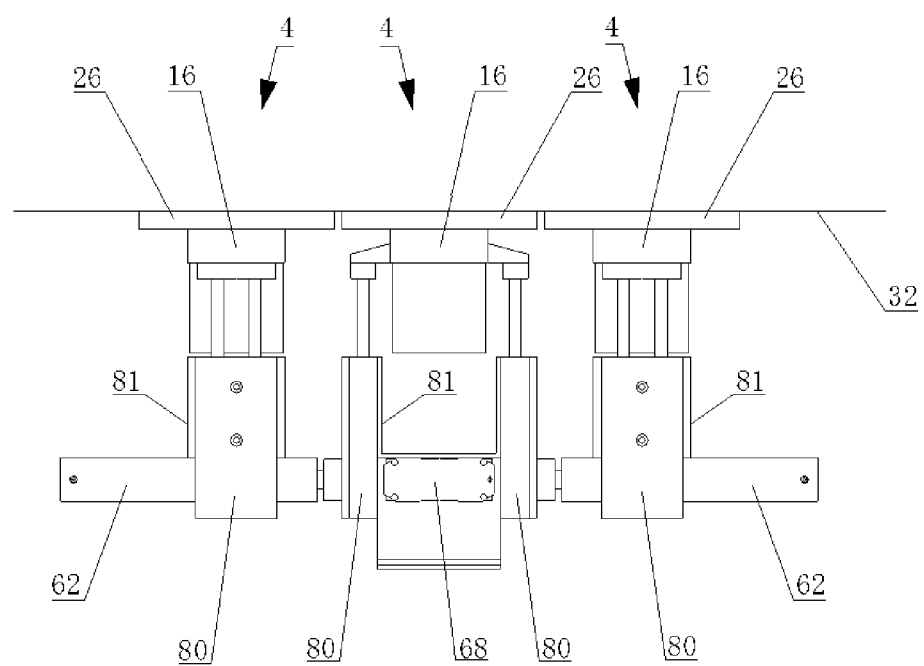
FIG. 4 is a top view of the device shown in FIG. 1, which shows the condition where the clinging unit putting forward/backward means 80 is expanded.
Figure 5:
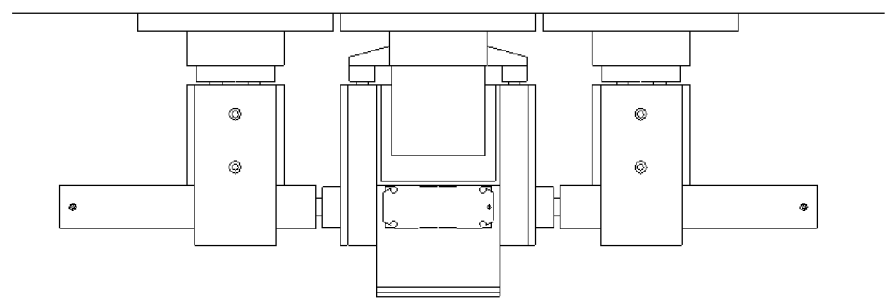
FIG. 5 is a top view of the device shown in FIG. 1, which shows the condition where the clinging unit putting forward/backward means 80 is contracted.
Figure 6:
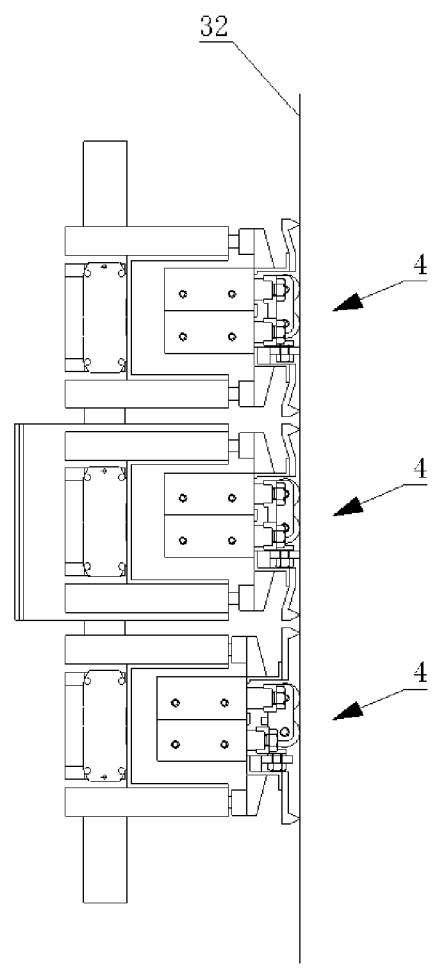
FIG. 6 is a fragmentary sectional view in the device shown in FIG. 3.
Figure 7:
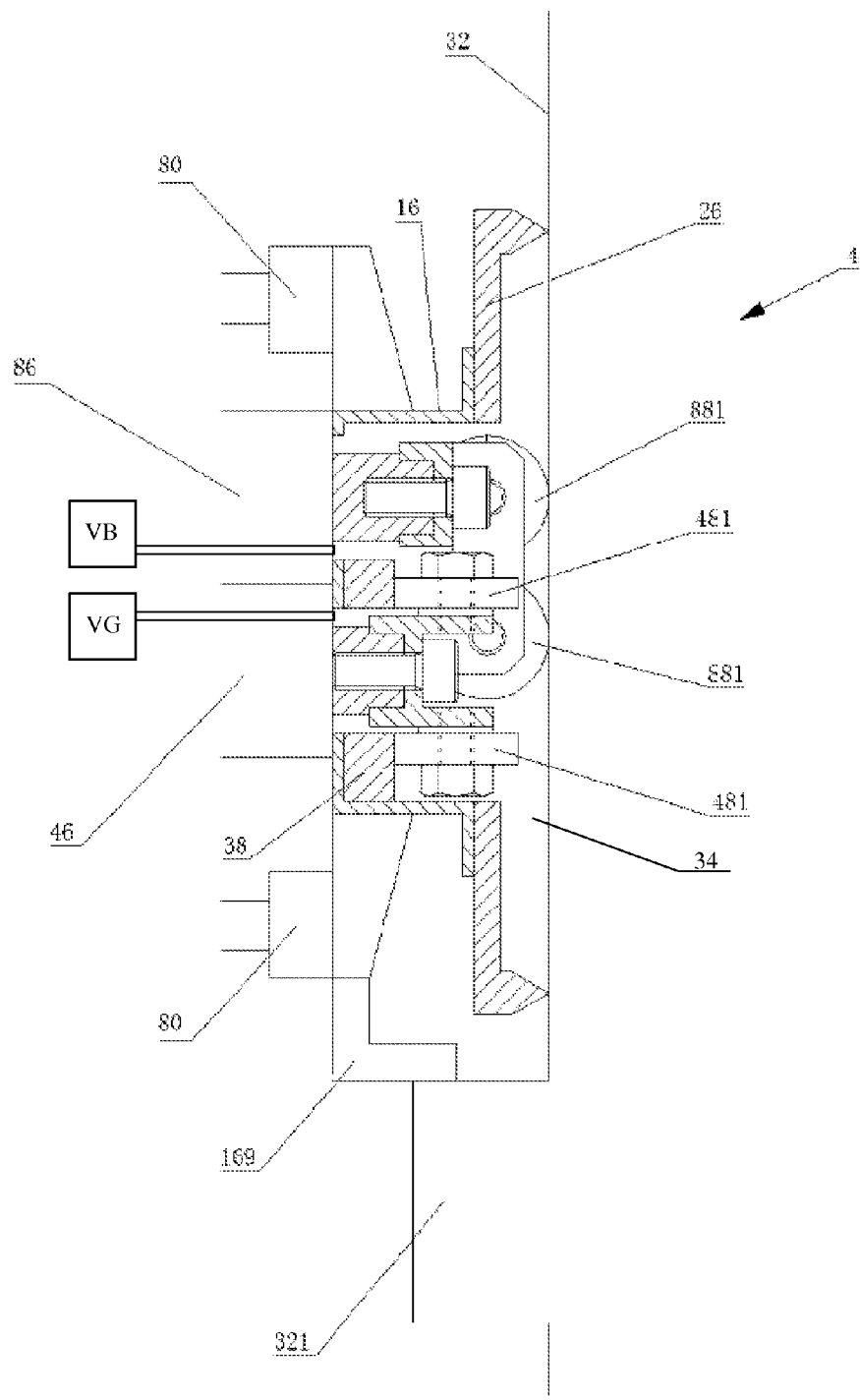
FIG. 7 is an enlarged and fragmentary sectional view of a clinging unit 4 in a lower end in the device shown in FIG. 6.
Figure 8:
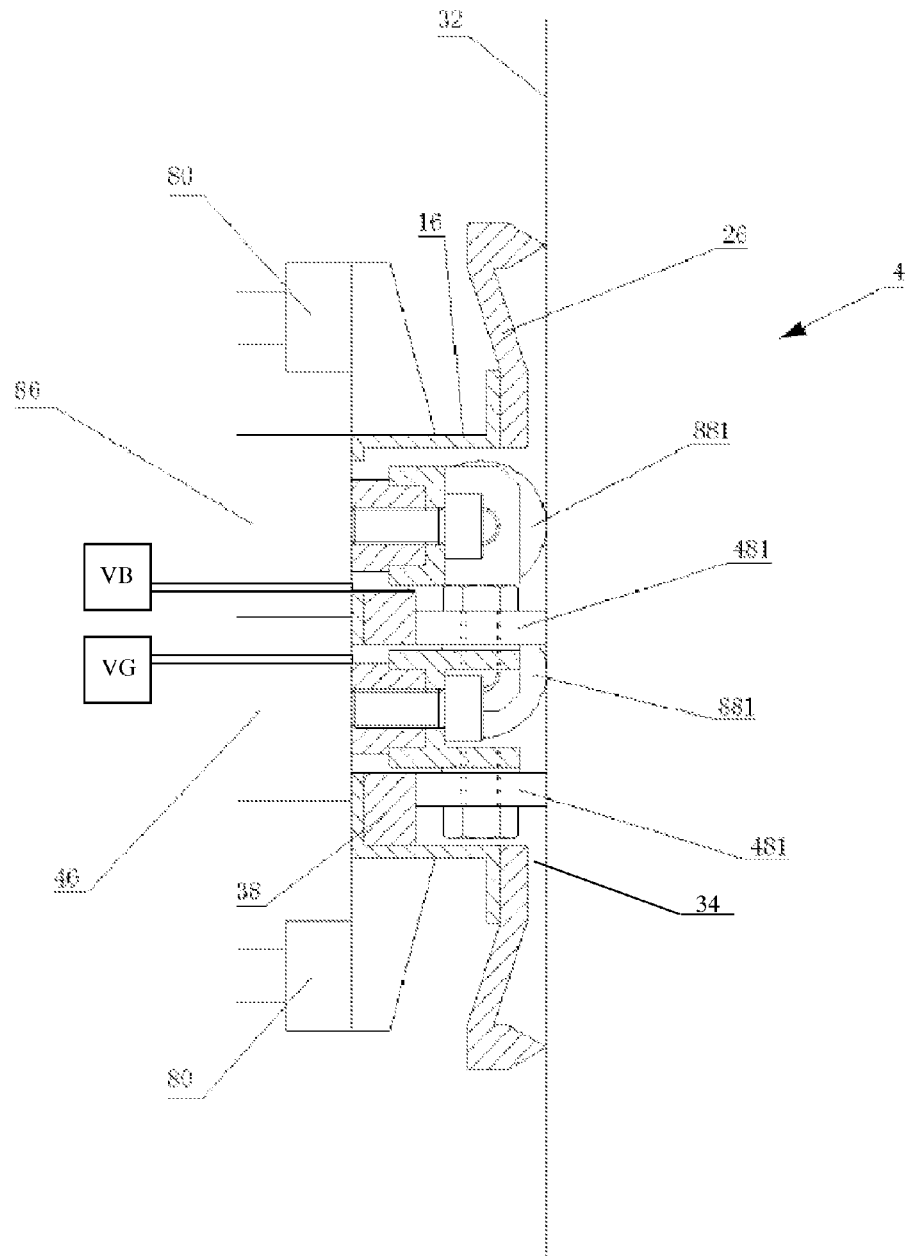
FIG. 8 is an enlarged and fragmentary sectional view of clinging units 4 in an upper end and in the center in the device shown in FIG. 6.
Figure 9:
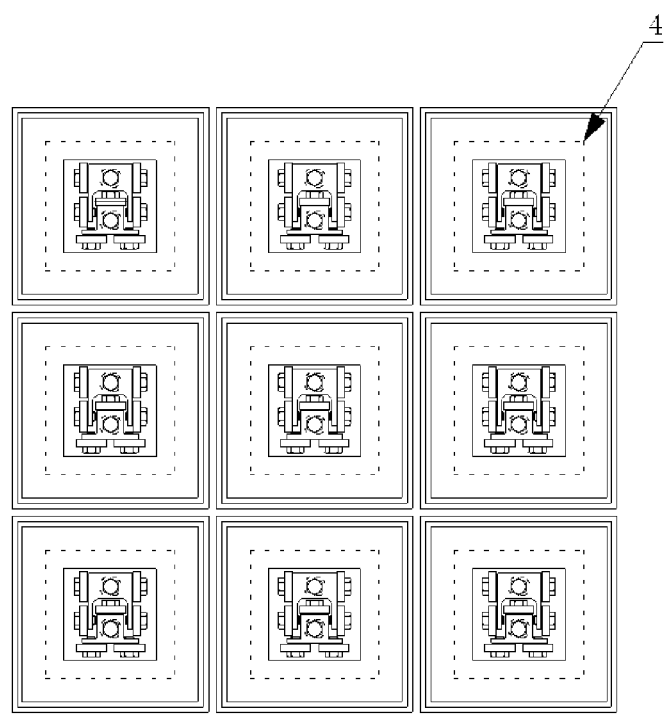
FIG. 9 is a rear view of the device shown in FIG. 1 viewed from the direction of a glass window.
Figure 10:
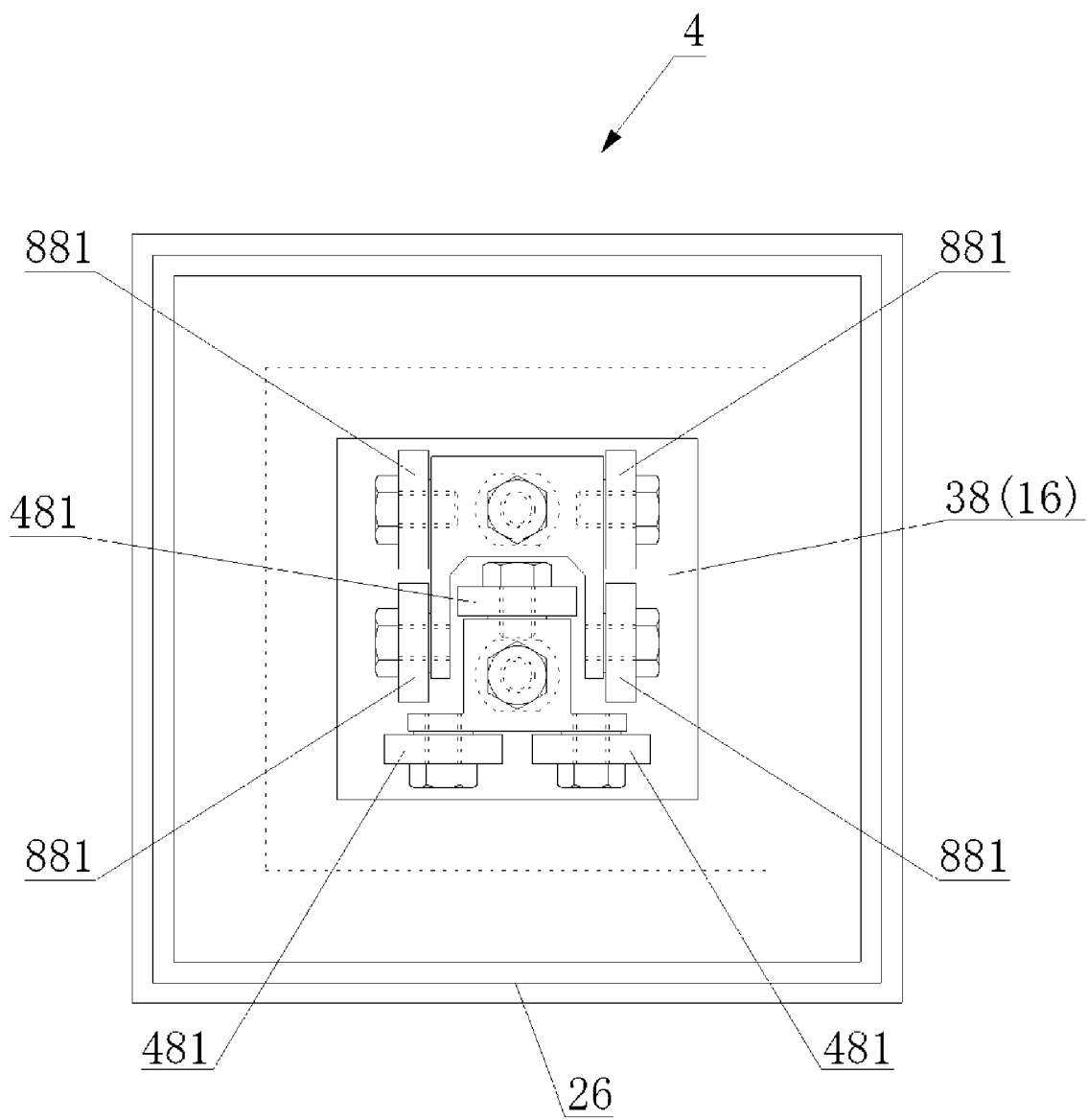
FIG. 10 is an enlarged view of one of nine clinging units 4 in the device shown in FIG. 9.
Figure 11:
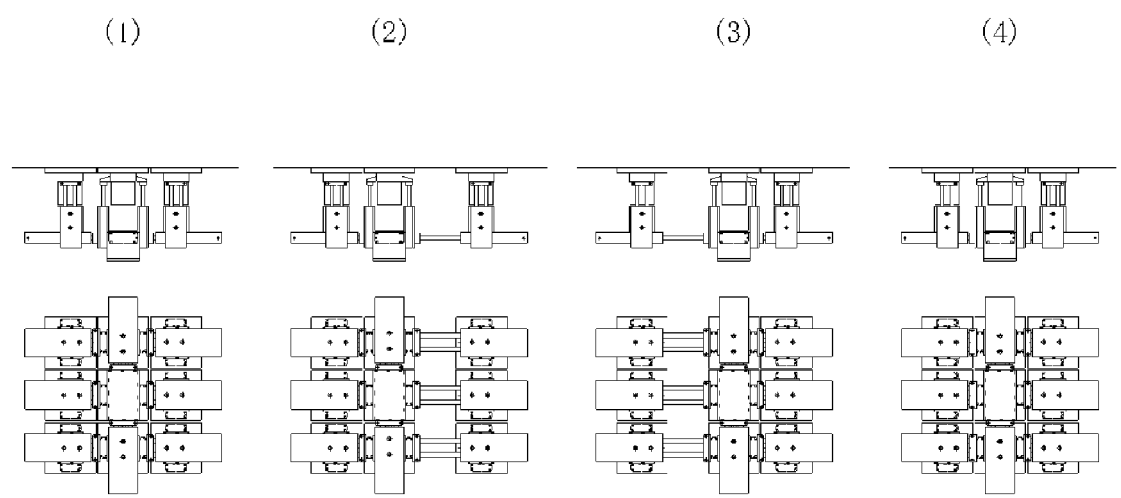
FIG. 11 is a view showing the procedure in which the device shown in FIG. 1 is held by vacuum on a glass window surface 32, and moved along the glass window surface 32 from the left to the right, thereby performing the cleaning for the glass window surface 32.
Figure 12:
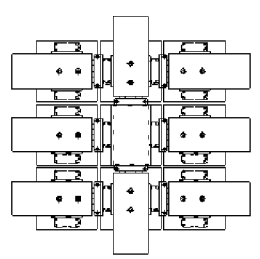
FIG. 12 is a view showing the procedure in which the device shown in FIG. 1 is held by vacuum on the glass window surface 32, and moved along the glass window surface 32 from the top to the bottom, thereby performing the cleaning for the glass window surface 32.
Figure 12:
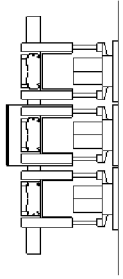
Figure 12:
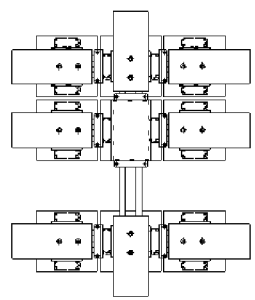
Figure 12:
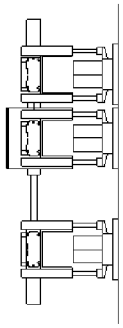
Figure 12:
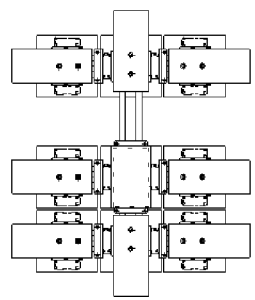
Figure 12:
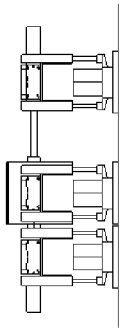
Figure 12:
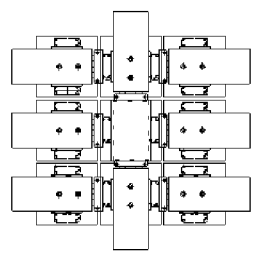
Figure 12:
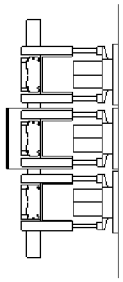
Figure 13:
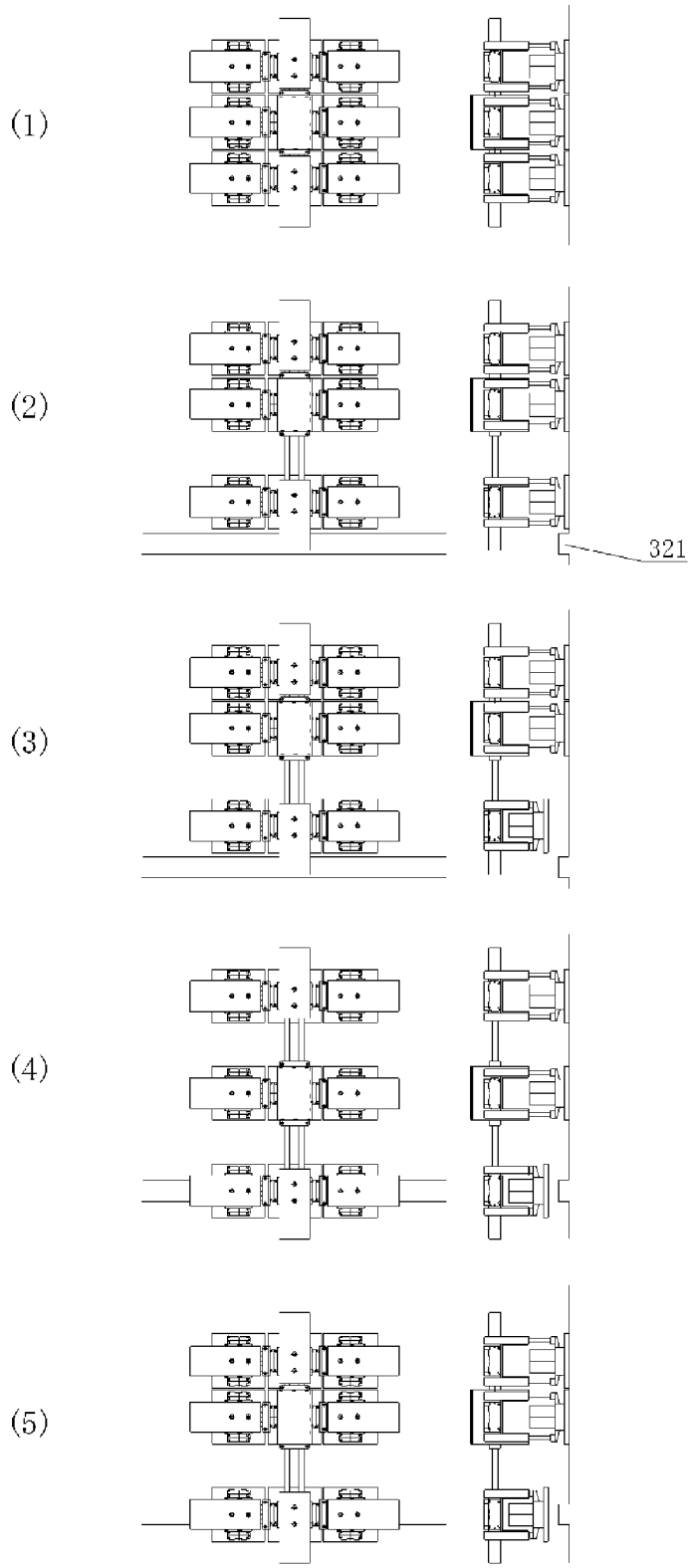
FIG. 13 is the first one of four views showing the procedure in which the device shown in FIG. 1 is held by vacuum on the glass window surface 32, moved along the glass window surface 32 from the top to the bottom, and moved by stepping over a window frame, thereby performing the cleaning for the glass window surface 32.
Figure 14:
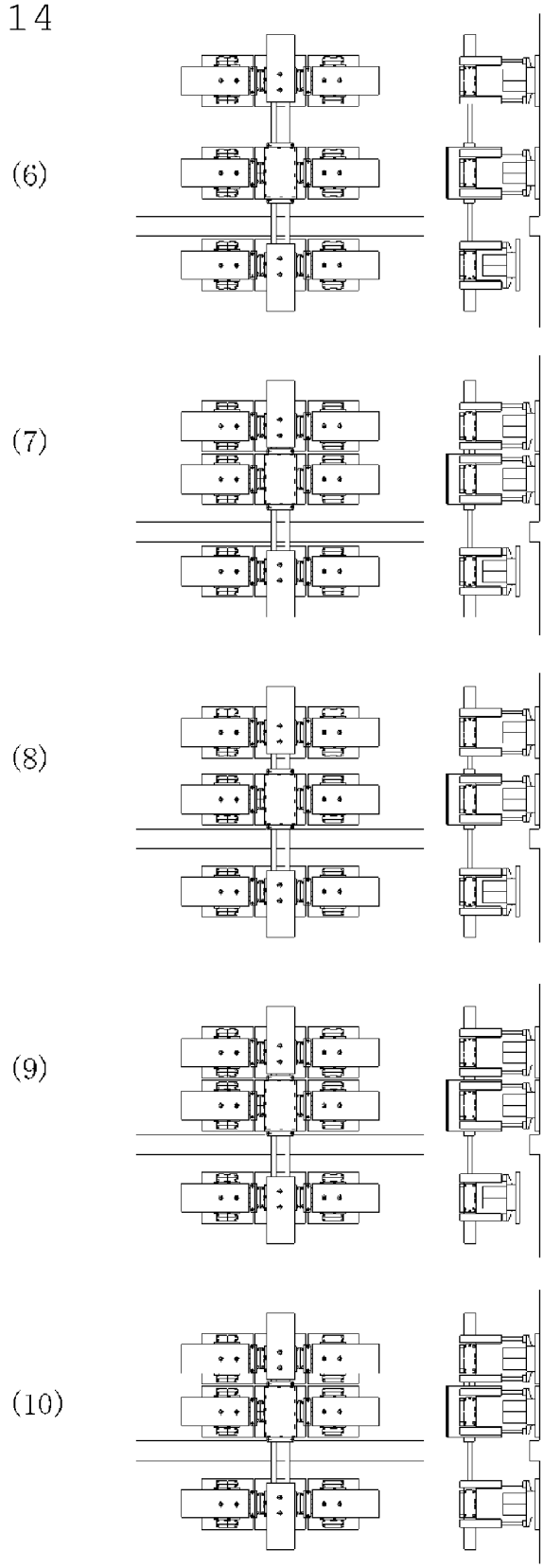
FIG. 14 is the second one of the four views showing the procedure in which the device shown in FIG. 1 is held by vacuum on the glass window surface 32, moved along the glass window surface 32 from the top to the bottom, and moved by stepping over a window frame, thereby performing the cleaning for the glass window surface 32.
Figure 15:
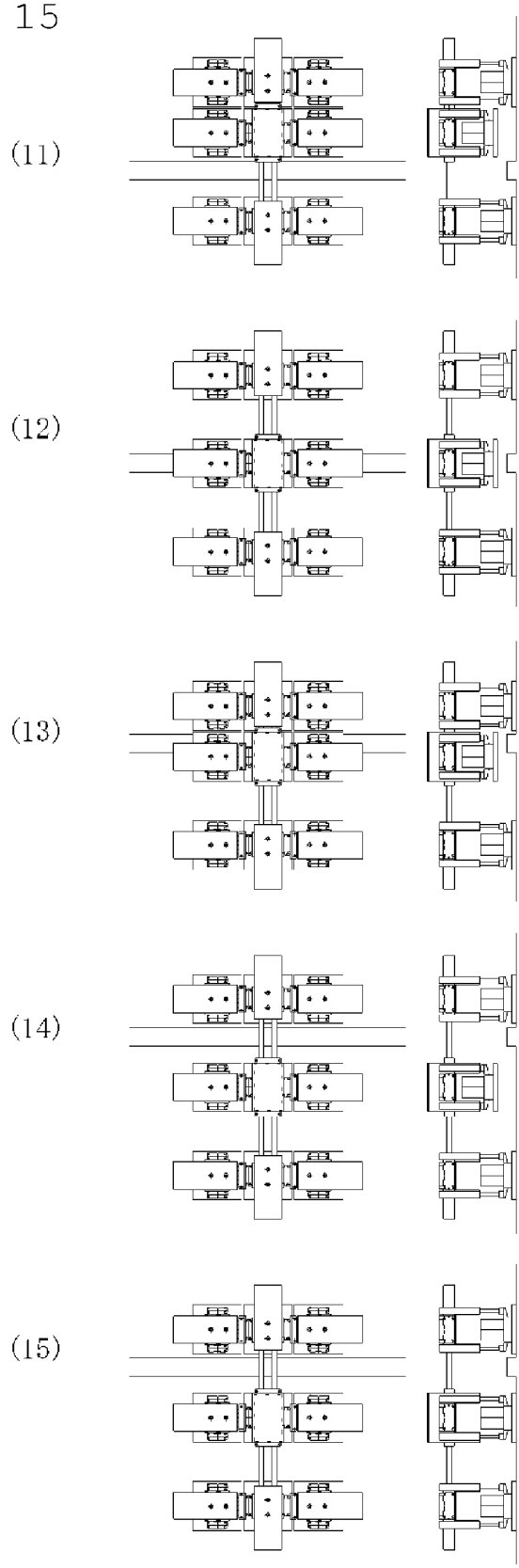
FIG. 15 is the third one of the four views showing the procedure in which the device shown in FIG. 1 is held by vacuum on the glass window surface 32, moved along the glass window surface 32 from the top to the bottom, and moved by stepping over a window frame, thereby performing the cleaning for the glass window surface 32.
Figure 16:
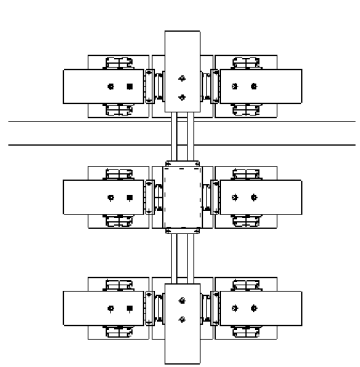
FIG. 16 is the fourth one of the four views showing the procedure in which the device shown in FIG. 1 is held by vacuum on the glass window surface 32, moved along the glass window surface 32 from the top to the bottom, and moved by stepping over a window frame, thereby performing the cleaning for the glass window surface 32.
Figure 16:
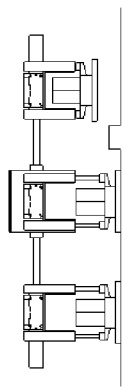
Figure 16:
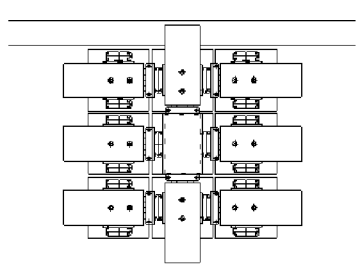
Figure 16:
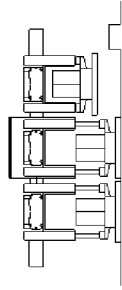
Figure 16:
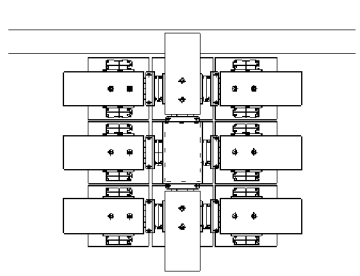
Figure 16:
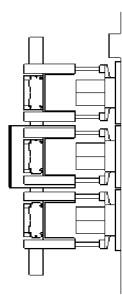
Figure 16:
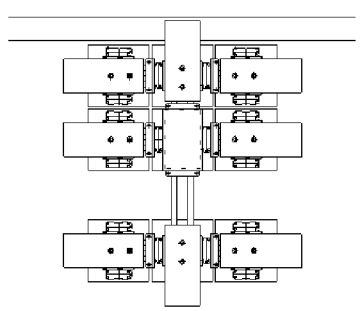
Figure 16:
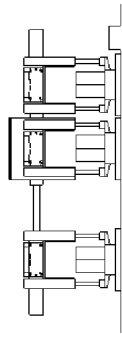
Figure 17:
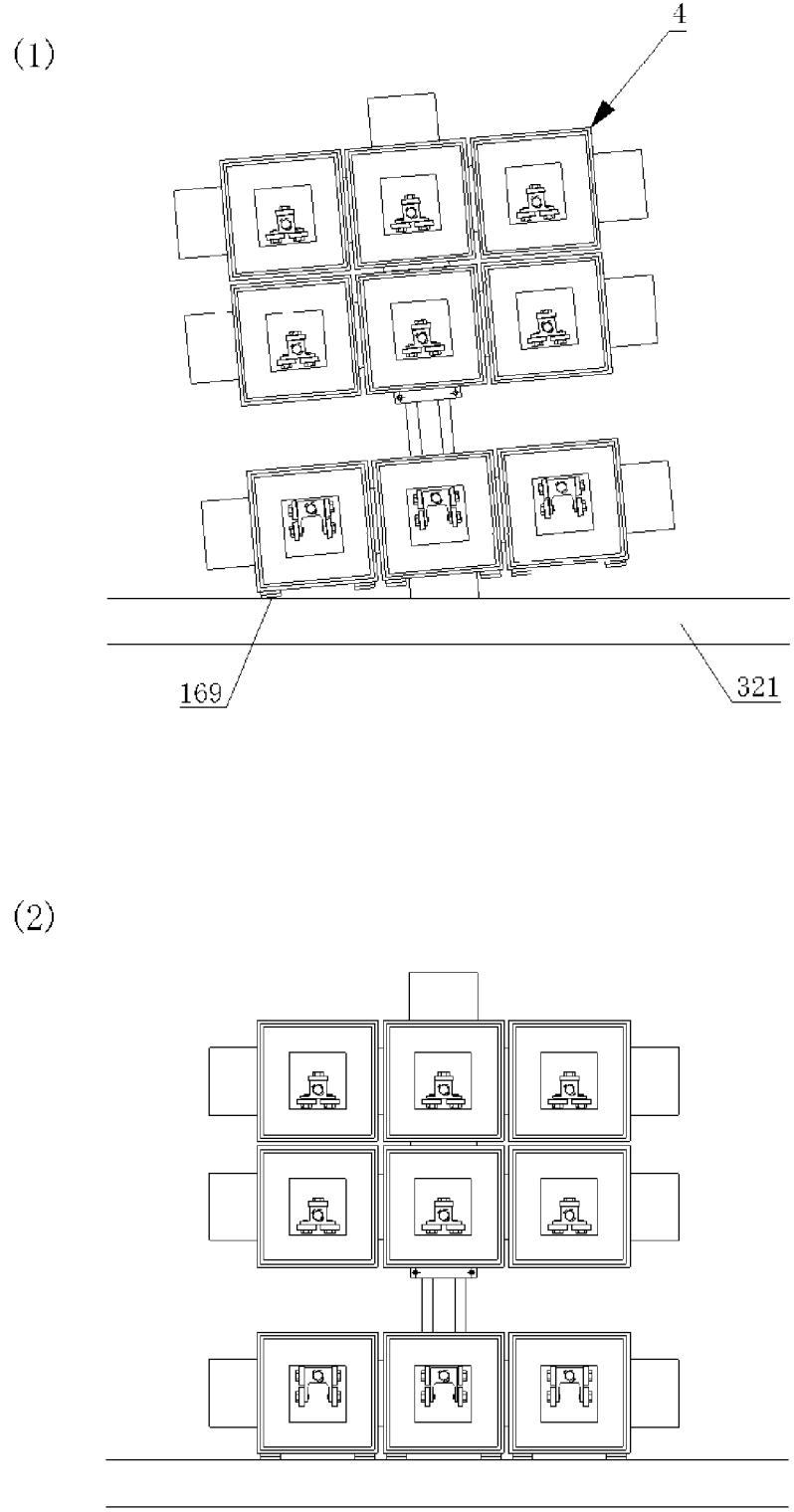
FIG. 17 is a view showing that, in the device shown in FIG. 1 which is held by vacuum on the glass window surface 32 and is moving downwards and obliquely from the vertical direction, when the window frame contact bumper 161 collides with the horizontal window frame 321, the device shown in FIG. 1 rotates slightly to the clockwise direction, thereby correcting the posture of the device shown in FIG. 1 to be parallel to the window frame 321.

The invention claimed is:

1. A cleaning device for a window glass, the cleaning device comprising:
a plurality of clinging units arranged in rows and columns, each of the plurality of clinging units including a clinging unit moving mechanism arranged to move the clinging unit forward and backward in a direction intersecting with a surface of the window glass;
transverse expansion and contraction units arranged to couple respective ones of the plurality of clinging units to each other via the clinging unit moving mechanisms so as to define a plurality of rows of clinging units arranged in a longitudinal direction;
lengthwise expansion and contraction units arranged to couple adjacent ones of the plurality of clinging units to each other via the clinging unit moving mechanisms so as to define a plurality of columns of clinging units arranged in a latitudinal direction; wherein
each of the plurality of clinging units is arranged to be selectively set in each of the following three states:
a clinging and movable state in which the clinging unit clings to the surface of the window glass and moves along the surface of the window glass;
a clinging and locked state in which the clinging unit clings to the surface of the window glass and is locked to the surface of the window glass; and
a non-clinging and movable state in which the clinging unit is separated from the surface of the window glass and moves along the surface of the window glass;
each of the plurality of clinging units includes at least a clinging unit frame member, a vacuum sealing member, a moving unit, and a locking unit;
at least the surface of the window glass, the clinging unit frame member, and the vacuum sealing member are arranged to define a reduced pressure space that is coupled to a vacuum generating unit and a vacuum breaking unit; and
one of the plurality of clinging units is arranged at a center of the cleaning device and connected to four of the plurality of clinging units via respective ones of the transverse expansion and contraction units and also via respective ones of the lengthwise expansion and contraction units.

2. The cleaning device according to claim 1, wherein each of the plurality of clinging units includes:
a transverse running wheel unit that enables a transverse running wheel including a shaft extending in a direction parallel to the surface of the window glass and in the longitudinal direction to protrude toward the surface of the window glass and to move in the latitudinal direction, and enables the transverse running wheel to be retracted from the surface of the window glass, such that the clinging unit is locked by a transverse running wheel unit moving mechanism; and
a lengthwise running wheel unit that enables a lengthwise running wheel including a shaft extending in a direction parallel to the surface of the window glass and in the latitudinal direction to protrude toward the surface of the window glass and to move in the longitudinal direction, and enables the lengthwise running wheel to be retracted from the surface of the window glass, such that the clinging unit is locked by a lengthwise running wheel unit moving mechanism; and
the transverse running wheel unit and the lengthwise running wheel unit define the moving unit and the locking unit.

3. The cleaning device according to claim 2, wherein a window frame contact bumper is attached to the clinging unit frame member, and when the cleaning device is held by a vacuum on the window glass and moved vertically in a direction toward a horizontal window frame along the window glass, the window frame contact bumper is caused to collide with the window frame, and before colliding, the transverse running wheel of the clinging unit located on a side which does not collide with the window frame is previously protruded toward the surface of the window glass, so as to be movable in the latitudinal direction.

4. The cleaning device according to claim 2, wherein a window frame contact bumper is attached to the clinging unit frame member, and when the cleaning device is held by a vacuum on the window glass and moved horizontally in a direction toward a vertical window frame along the window glass, the window frame contact bumper is caused to collide with the window frame, and before colliding, the lengthwise running wheel of the clinging unit located on a side which does not collide with the window frame is previously protruded toward the surface of the window glass, so as to be movable in the longitudinal direction, so as to correct a posture of the cleaning device to be parallel to the window frame.

5. The cleaning device according to claim 1, wherein a window frame contact bumper is attached to the clinging unit frame member, and when the cleaning device is held by a vacuum on the window glass and moved toward a horizontal window frame in a vertical direction along the window glass, the window frame contact bumper is caused to collide with the window frame, so as to correct a posture of the cleaning device to be parallel to the window frame.

* * * * *